United States Patent [19]

Oshizawa et al.

[11] Patent Number: 5,680,312
[45] Date of Patent: Oct. 21, 1997

[54] METHOD AND APPARATUS FOR SELECTING A DESTINATION IN A VEHICLE NAVIGATION SYSTEM

[75] Inventors: Hidekazu Oshizawa; Takao Fujii, both of Cupertino; Toshihiro Hamahata, Palo Alto; Haruhisa Tamai, Sunnyvale, all of Calif.

[73] Assignee: Zexel Corporation, Tokyo, Japan

[21] Appl. No.: 477,495

[22] Filed: Jun. 7, 1995

[51] Int. Cl.⁶ .......................... G06F 17/30; G06F 165/00
[52] U.S. Cl. ........................ 364/444.2; 364/444.1
[58] Field of Search .......................... 364/443, 444, 364/449, 444.1, 444.2, 449.2, 449.4; 340/989, 995; 345/123, 124, 145, 146

[56] References Cited

U.S. PATENT DOCUMENTS

| | | | |
|---|---|---|---|
| 3,845,289 | 10/1974 | French | 235/151.2 |
| 4,241,521 | 12/1980 | Dufresne | 434/112 |
| 4,570,227 | 2/1986 | Tachi et al. | 364/444 |
| 4,608,656 | 8/1986 | Tanaka et al. | 364/449 |
| 4,611,293 | 9/1986 | Hatch et al. | 364/571 |
| 4,672,565 | 6/1987 | Kuno et al. | 364/571 |
| 4,673,878 | 6/1987 | Tsushima et al. | 324/226 |
| 4,723,218 | 2/1988 | Hasebe et al. | 364/449 |
| 4,734,863 | 3/1988 | Honey et al. | 364/449 |
| 4,746,913 | 5/1988 | Volta | 340/706 |
| 4,751,512 | 6/1988 | Longaker | 342/357 |
| 4,758,829 | 7/1988 | Smith, III | 340/712 |
| 4,782,447 | 11/1988 | Ueno et al. | 364/449 |
| 4,796,191 | 1/1989 | Honey et al. | 364/450 |
| 4,797,841 | 1/1989 | Hatch | 364/571.04 |
| 4,831,563 | 5/1989 | Ando et al. | 364/571.05 |
| 4,862,398 | 8/1989 | Shimizu et al. | 364/571.05 |
| 4,870,389 | 9/1989 | Ishiwata et al. | 340/709 |
| 4,902,878 | 2/1990 | Smith et al. | 219/486 |
| 4,914,605 | 4/1990 | Loughmiller, Jr. et al. | 364/518 |
| 4,918,609 | 4/1990 | Yamawaki | 364/449 |
| 4,926,336 | 5/1990 | Yamada | 364/444 |
| 4,937,753 | 6/1990 | Yamada | 364/449 |
| 4,964,052 | 10/1990 | Ohe | 364/449 |
| 4,970,652 | 11/1990 | Nagashima | 364/449 |
| 4,982,332 | 1/1991 | Saito et al. | 364/449 |
| 4,984,168 | 1/1991 | Neukirchner et al. | 364/449 |
| 4,989,151 | 1/1991 | Nuimura | 364/449 |
| 4,992,947 | 2/1991 | Nimura et al. | 364/444 |
| 4,996,645 | 2/1991 | Schneyderberg Van der Zon | 364/449 |
| 4,999,783 | 3/1991 | Tenmoku et al. | 364/450 |
| 5,040,122 | 8/1991 | Neukirchner et al. | 364/449 |
| 5,046,011 | 9/1991 | Kakihara et al. | 364/449 |
| 5,059,965 | 10/1991 | Geiser | 340/995 |
| 5,060,162 | 10/1991 | Ueyama et al. | 364/449 |
| 5,072,395 | 12/1991 | Bliss et al. | 364/443 |
| 5,197,009 | 3/1993 | Hoffman, Jr. et al. | 364/443 |
| 5,231,584 | 7/1993 | Nimura et al. | 364/444 |

(List continued on next page.)

OTHER PUBLICATIONS

R.L. French, "MAP Matching Origins Approaches and Applications," Rober L. French & Associates, 3815 Lisbon St., Suite 201, Fort Worth, Texas 76107, USA, pp. 91–116. Date Uknown.

*Primary Examiner*—Michael Zanelli
*Attorney, Agent, or Firm*—Hickman Beyer & Weaver

[57] ABSTRACT

A method and apparatus is described for selecting an entry stored in a data processing system, and specifically a destination in a vehicle navigation system. The system includes a display, a scrolling control having first and second controls, and a selecting control. Using the scrolling control, the user of the system scrolls through a plurality of stored destinations on the display. Each destination is made up of a plurality of alphanumeric symbols, the destinations forming an alphabetically and numerically organized list. The scrolling is accomplished by using the first control of the scrolling control. A character position selector is used to select a character position in a first indicated destination and the second control of the scrolling control is used to jump to subsets of destinations with the next or previous character position as compared to a currently indicated destination. The selecting control is then used to enter a desired destination.

29 Claims, 11 Drawing Sheets

U.S. PATENT DOCUMENTS

| | | | |
|---|---|---|---|
| 5,289,572 | 2/1994 | Yano et al. | 395/155 |
| 5,303,288 | 4/1994 | Duffy et al. | 379/59 |
| 5,345,382 | 9/1994 | Kao | 364/424.01 |
| 5,345,807 | 9/1994 | Butts et al. | 73/4 R |
| 5,359,529 | 10/1994 | Snider | 364/449 |
| 5,374,933 | 12/1994 | Kao | 342/357 |
| 5,377,113 | 12/1994 | Shibazaki et al. | 364/449 |
| 5,555,172 | 9/1996 | Potter | 364/424.01 |
| 5,559,707 | 9/1996 | Delorme et al. | 364/443 |

METHOD AND APPARATUS FOR SELECTING A DESTINATION IN A VEHICLE NAVIGATION SYSTEM

BACKGROUND OF THE INVENTION

The present invention relates to a method and apparatus for selecting an entry in a data processing system. More specifically, a specific embodiment of the invention is described which provides a method and apparatus for selecting a destination in a vehicle navigation system.

The state of the art of electronic vehicle navigation technology is rapidly improving. Sophisticated and reliable systems are presently being used by a growing but small percentage of automobile operators. However, if such systems are to become ubiquitous, they must be simple, easy to use, and inexpensive.

When designing a "user friendly" vehicle navigation system, one important consideration is the method by which the user communicates a desired destination to the system. The number of steps in such a method should be kept to a minimum. Furthermore, the apparatus controls should be a model of simplicity in order that the user not be confused or intimidated. In the past, several techniques have been employed to enable the user of a vehicle navigation system to select a destination. Examples of such techniques appear in U.S. Pat. Nos. 5,059,965 to Geiser, and No. 5,072,395 to Bliss et at.

Geiser describes a technique in which the selection of a destination is effected by a position-by-position scrolling of the letters of the alphabet. According to this technique, the user enters each alphanumeric character of the desired destination in a stepwise manner, scrolling through the alphabet for each position until the desired letter is reached. An acoustic acknowledgement of each selected character occurs so that the user does not need to take his eyes off the road. Unfortunately, this method of selecting a destination has several limitations. Entering a destination character-by-character is tedious and inefficient. Moreover, such a method assumes that the user knows the exact name of the destination and the correct spelling; not necessarily a valid assumption.

Bliss describes a navigation system with an "easily learned" destination selection interface. The console display has four data fields in which different levels of destination specificity simultaneously appear. For example, one field might specify the city in which the destination exists, while another might specify the state, while the remaining two specify the street name and number. The user scrolls through each data field using a pair of up/down keys for each field. When each of the four data fields shows the desired destination, the user may enter the selection using an enter key. Some of the limitations of the system described by Bliss relate to the display. Because of the amount of data which must appear on the screen, there is a lower limit on the size of the display which may be incorporated into the system. As display size increases, so does the cost of the system; often dramatically. For example, the cost of a 6 in. LCD screen can be much as three times the cost of a 4 in. screen. Additionally, the more information which simultaneously appears on the display screen, the more likely that the user will find the system intimidating and not "user friendly". Some systems have employed touch sensitive display screens for the selection of a destination, but such systems require overly large and expensive display screens to implement this feature.

Thus, a vehicle navigation system is needed which allows the user to enter a desired destination in an easy to understand and efficient manner, and which is capable of incorporating a small display screen, thereby reducing the cost of the system.

SUMMARY OF THE INVENTION

A method and apparatus for selecting an entry in a data processing system, and more specifically, a destination in a vehicle navigation system, are disclosed which address the limitations of previous systems. The system comprises a display, scrolling means having first and second controls, and selecting means. Using the scrolling means, the user of the system scrolls through a plurality of stored destinations on the display. Each destination comprises a plurality of alphanumeric symbols, the destinations forming an alphabetically and numerically organized list. The scrolling occurs in response to first and second scrolling signals generated by the first and second controls of the scrolling means. The first scrolling signal causes the display to scroll through destinations in the list, and the second scrolling signal causes the display to jump to a subset of destinations beginning with the next or previous alphanumeric symbol as compared to a currently indicated (e.g., highlighted) destination. In another embodiment, a character position selection means generates a position selection signal which is used to select a character position in a first indicated destination, and the second control of the scrolling means is then used to jump to subsets of destinations with the next or previous alphanumeric symbol in that character position as compared to a currently indicated destination. In either embodiment, a currently indicated destination is then entered in response to a selection signal generated by the selecting means.

In one embodiment, the user scrolls through a plurality of stored street names which form an alphabetically and numerically organized list. The scrolling is accomplished by using the first and second controls of the scrolling means in the manner described above. The user then enters a highlighted street using the selecting means. A specific street address on the entered street is then selected using the first control of the scrolling means to scroll through a particular column position of alphanumeric symbols representing a digit in the address until a first desired alphanumeric symbol is reached. The second control of the scrolling means is then used to change the column position being scrolled, and the next digit is selected. When all of the digits of the street address are selected, the user enters the street address using the selecting means.

In another embodiment, the user scrolls through a plurality of stored streets which form a first alphabetically and numerically organized list. The scrolling is accomplished by using the first and second controls of the selecting means as described above. The user enters a first highlighted street using the selecting means. The user then scrolls through a second list of alphabetically and numerically arranged streets, the second list of streets comprising streets intersecting with the first highlighted street. Finally, the user enters a second highlighted street using the selecting means, thereby designating the intersection of the two streets as the desired destination.

Each of the above described methods of selecting a destination may be used with a system which further comprises auxiliary scrolling means. Using the auxiliary scrolling means simultaneously with the first control of the scrolling means, the user may increase the speed with which destinations are consecutively highlighted.

An apparatus for selecting a destination in a vehicle navigation system having the above described features is also disclosed. The apparatus further comprises means for cancelling a selection selected by the selecting means.

A further understanding of the nature and advantages of the present invention may be realized by reference to the remaining portions of the specification and the drawings.

DESCRIPTION OF SPECIFIC EMBODIMENTS

The present invention relates generally to commonly assigned, United States Patents for CALIBRATION METHOD FOR A RELATIVE HEADING SENSOR, U.S. Pat. No. 5,345,382 issued on Sep. 6, 1994, ROUTE GUIDANCE ON/OFF-ROUTE STATE FILTER, U.S. Pat. No. 5,359,529 issued on Oct. 25, 1994, and POSITION CORRECTION METHOD FOR VEHICLE NAVIGATION SYSTEM, U.S. Pat. No. 5,374,933 issued on Dec. 20, 1994, the entire specifications of which are incorporated herein by reference.

Figure 1:
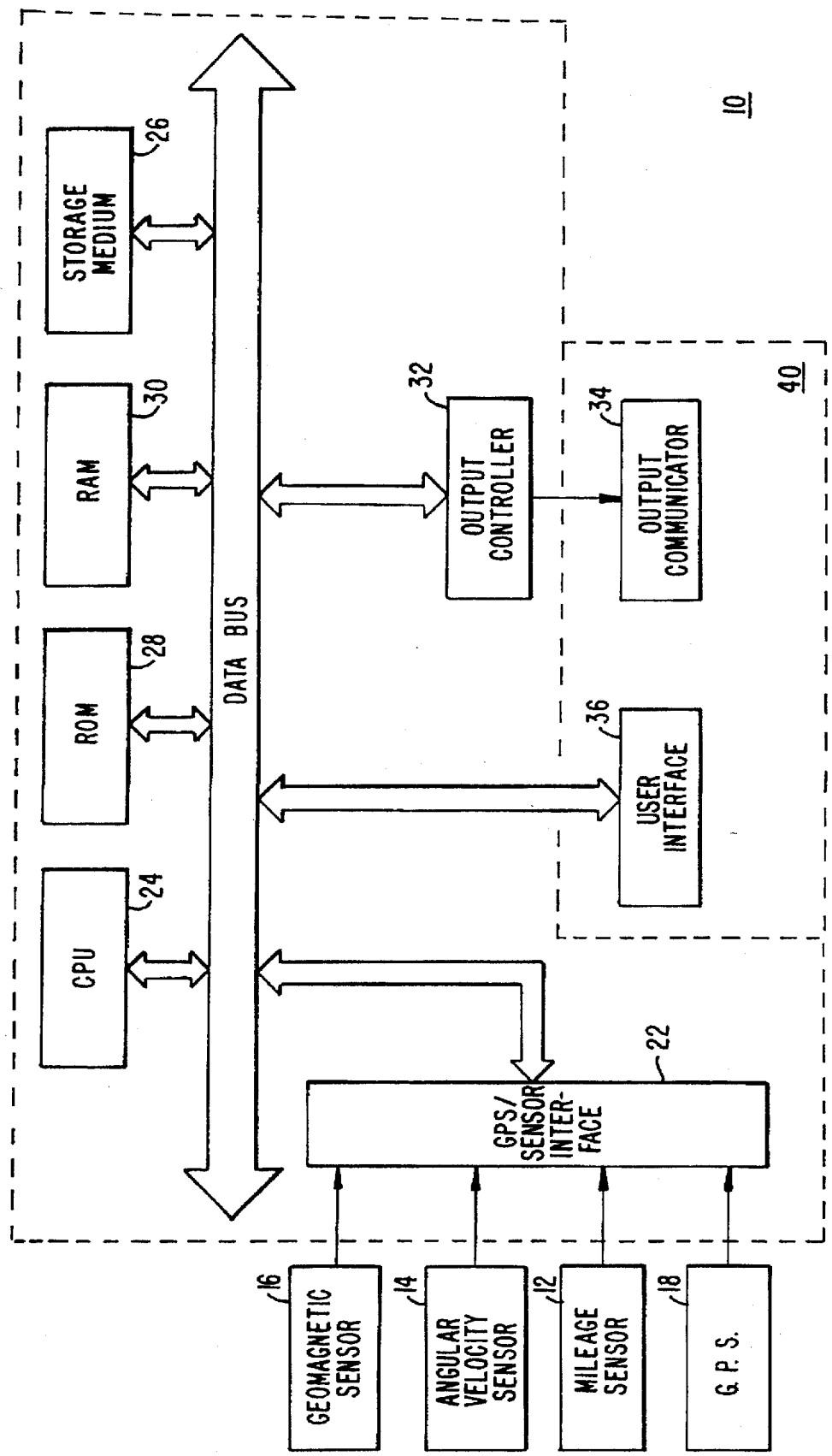
FIG. 1 is a block diagram of a specific embodiment of a vehicle navigation system for use with the present invention.

FIG. 1 is a block diagram of a specific embodiment of a vehicle navigation system 10 for use with the present invention. Sensors 12 to 16 and GPS receiver 18 are coupled to computing means 20 through sensor/GPS interface 22. In typical embodiments, the mileage sensor 12 comprises an odometer; the angular velocity sensor 14 comprises a gyroscope, or a differential odometer coupled to the wheels of the vehicle; and the geomagnetic sensor 16 usually comprises a magnetic compass mounted in the vehicle. A global positioning system (GPS) data receiver 18 is provided for receiving signals from, for example, a satellite-based navigation system. Data from sensor/GPS interface 22 is transmitted to CPU 24, which performs calibration, signal processing, dead-reckoning, vehicle positioning, and route guidance functions. A data base containing map information may be stored in storage medium 26, with software directing the operation of computing means 20 stored in ROM 28 for execution by CPU 24. RAM 30 permits reading and writing of the information necessary to execute such software programs. Storage medium 26 may comprise a hard disk drive, CD-ROM or integrated circuit onto which digitized map information has been stored. Output controller 32, which may comprise a graphics controller, receives data processed by CPU 24 and transmits such data to output communicator 34, usually comprising a display screen. The user may input data, such as a desired destination, through user interface 36, typically comprising a keyboard.

The map data base stored in storage medium 26 preferably comprises positional data such as, for example, latitude and longitude coordinates, to describe road intersections, road segments, landmarks and points of interest, and other geographical information. The data base may further comprise data representing characteristics of roads or places on the map, such as road and place names, road features such as dividers, one-way restrictions, surface, speed limit, shape, elevation, and other properties. Using the data stored in the map data base, the vehicle navigation system generates one or more possible positions of the vehicle by comparing the dead-reckoned position to the road segments, intersections, and other geographical locations stored in the data base. The system then filters the set of position possibilities and selects from the remaining position possibilities a position deemed to be the current position of the vehicle.

Figure 2A:
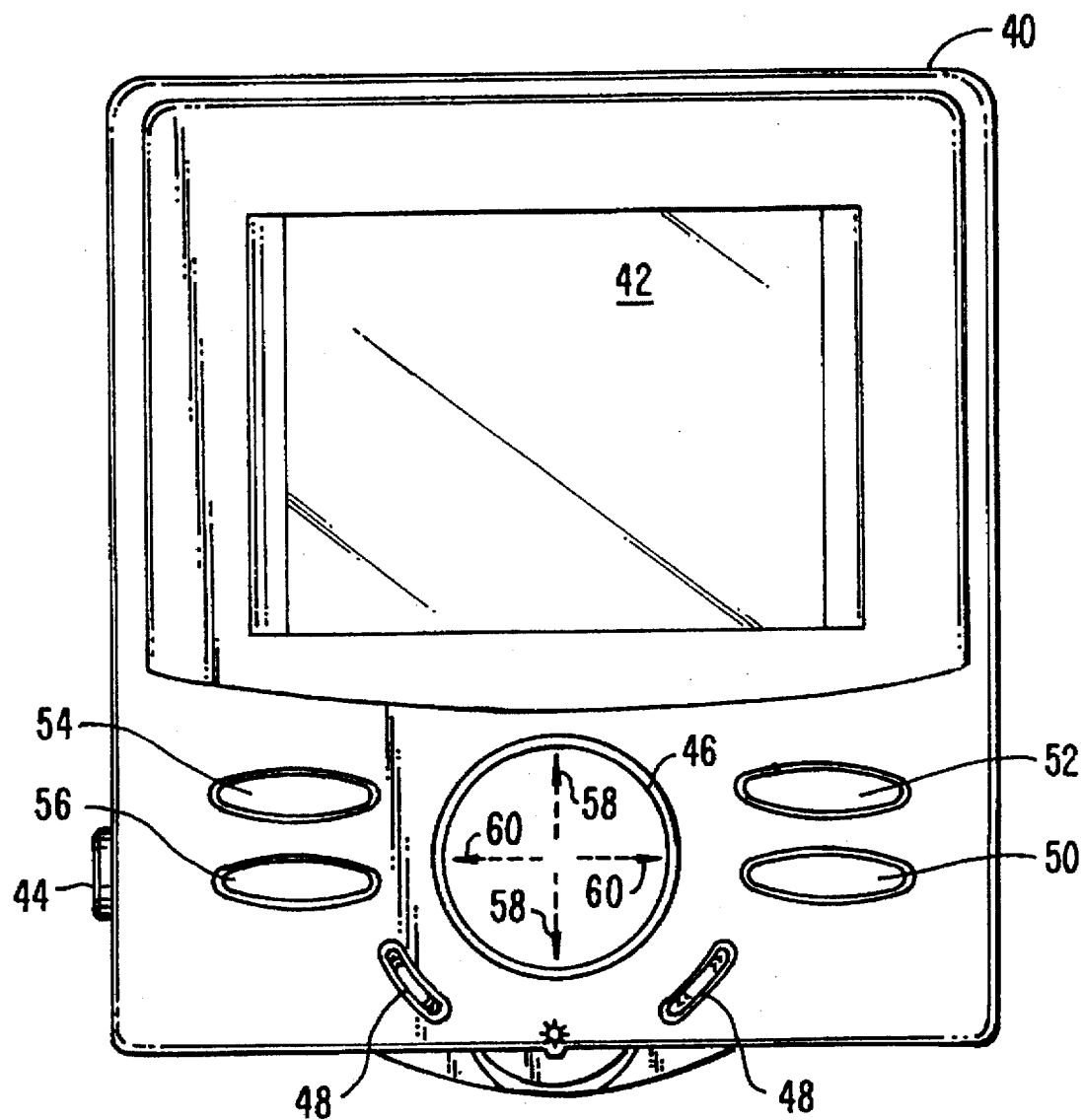
FIG. 2a is an illustration of a vehicle navigation system display console designed according to the present invention.

FIG. 2a is an illustration of a vehicle navigation system display console 40 designed according to the present invention. Console 40 has a display screen 42, a power switch 44, and seven function keys 46–56. A scrolling key 46 is centrally located below display screen 42 with two "Quick Scroll" keys 48 adjacent scrolling key 46 to its left and right. Scrolling key 46 controls the position of a cursor on display screen 42 during destination selection. "Quick Scroll" keys 48 both perform the same function which is to increase the speed with which scrolling key 46 scrolls through destination options on display screen 42. Enter key 50 allows the user of the vehicle navigation system to enter the destination option currently highlighted by the cursor. Cancel key 52 allows the user to cancel the current operation and return to the previous step. Thus, if an incorrect destination is entered with enter key 50, cancel key 52 can be used to immediately correct the error. Route/Map key 54 allows the user to switch between two different route guidance modes. Option key 56 allows the user to reconfigure various features of the system set up.

Figure 2B:
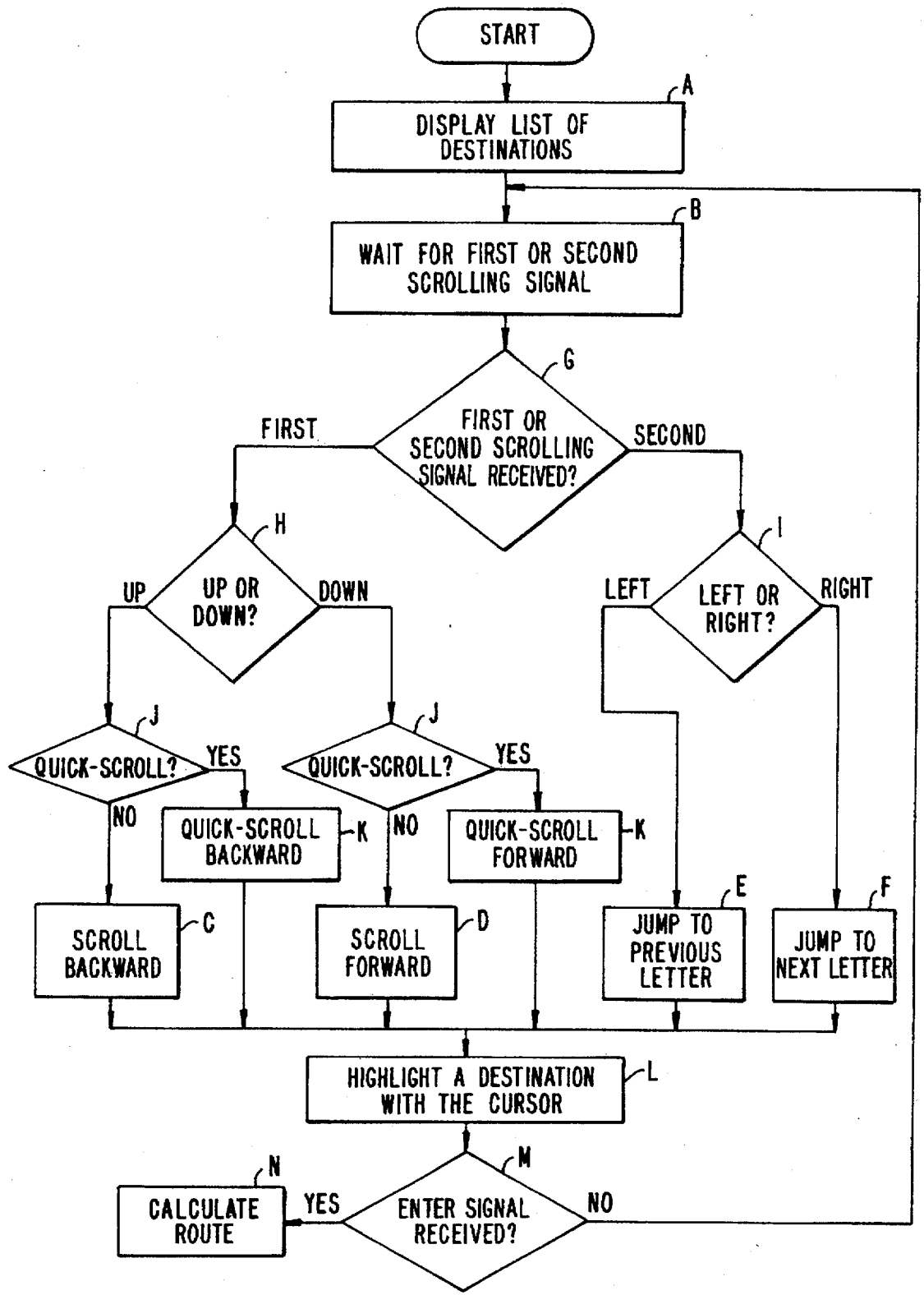
FIG. 2b is a flowchart representing a method by which a cursor on the display screen is manipulated using the scrolling means of the present invention.

FIG. 2b is a flowchart representing the method by which the cursor position is manipulated through a list of destinations using the scrolling means of the present invention. Scrolling key 46 has a first control (designated by upward and downward oriented arrows 58), and a second control (designated by left and right oriented arrows 60). Depressing arrows 58 of the first control generates a first scrolling signal which moves the cursor up and down the list of destinations in the order in which they appear on the screen. When one of arrows 58 is depressed simultaneously with either "Quick Scroll" key 48, the scrolling speed increases. In an alternate embodiment, the "Quick Scroll" key is eliminated and the scrolling speed is increased by keeping the first control, i.e., arrows 58, depressed for a set period of time. For example, if one of the arrows 58 is depressed for more than three seconds, the scrolling speed automatically increases. The second control generates a second scrolling signal which causes the cursor to jump to the groups of destinations beginning with the next or previous alphanumeric character in relation to the first alphanumeric character of the currently highlighted destination. For example, if the user depresses right oriented arrow 60 while the display screen currently has a destination highlighted which begins with the letter "A", the first destination beginning with the letter "B" will be highlighted.

The vehicle navigation system first displays a list of destinations and waits for a scrolling signal (steps A and B). When a scrolling signal is received, the system performs the appropriate function (steps C–F) depending upon what type of scrolling signal was received, e.g., up or down signal, or left or right signal (decision boxes G, H, and I). Scrolling speed is increased if a "quick-scroll" signal is received (decision boxes J and steps K). When the desired destination is finally highlighted (step L), the reception of an enter signal from the enter key (decision box M) causes the system to calculate the route to the selected destination (step N).

According to a different embodiment of the invention, when the user has caused the cursor to jump to the group of destinations beginning with the desired alphanumeric character, she may similarly jump through the destinations in that group using the second, third, or nth character in each destination. Referring again to FIG. 2a, either of keys 48, instead of being used for the quick scrolling function described above, may be employed by the user to selecting a character position by moving the cursor laterally within a particular destination from one character position to another. The user may then use right and left arrows 60 to jump forward or backward in the list of destinations to the group of destinations having the next or previous character at the current cursor position. Continuing with the example above, once the user has highlighted the first destination beginning with the letter "B", e.g., "BAKER ST.", she may select the second character position by depressing one side of either of keys 48, each of which may comprise a rocker switch. She may then cause the cursor to jump to a group of destinations within the group of destinations beginning with the letter "B", and immediately following the group beginning with the letters "BA", by depressing right oriented arrow 60 in the manner described above. This might be, for example, destinations beginning with the letters "BE", e.g., "BECKETT AVE", as the combinations "BB", "BC", and "BD" at the beginning of a destination are not likely. Depression of the left oriented arrow 60 would similarly facilitate jumping to the previous group, i.e., from the group beginning with "BE" back to the group beginning with "BA".

The above-described process may be repeated with each successive character position. For example, having highlighted the destination "BECKETT AVE.", the user then may select the third character position with keys 48 and, using right oriented arrow 60, jump from destinations beginning with "BEC" to destinations beginning with "BED", "BEE", "BEF", and so on. As before, left oriented arrow 60 may be employed to jump backward to previous groups. Each character position out to the nth position may be used in this manner to increase the speed and efficiency with which a destination may be highlighted and selected.

Figure 2C:
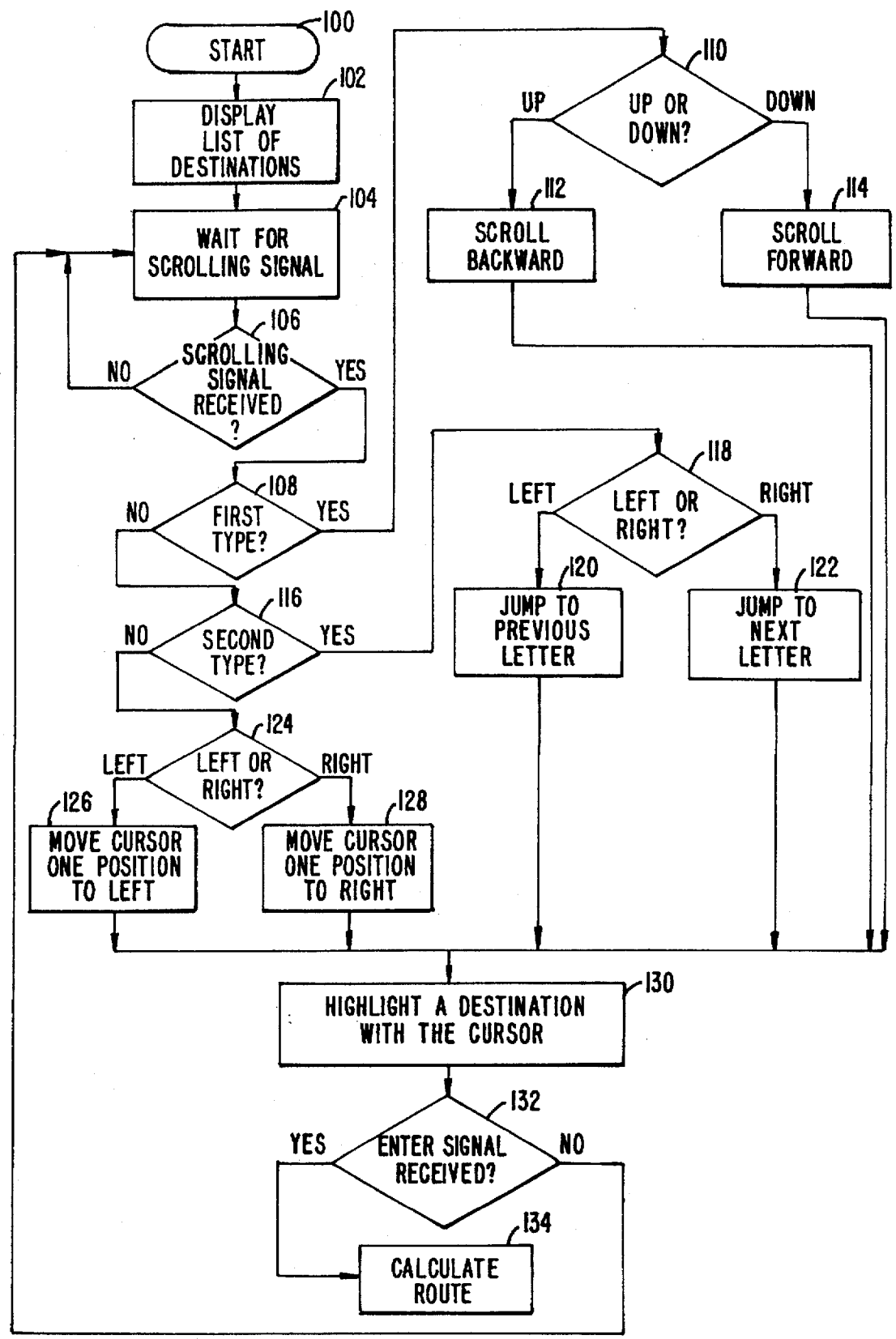
FIG. 2c is a flowchart representing mother method by which the cursor position is manipulated through a list of destinations using the scrolling means of the present invention.

FIG. 2c is a flowchart representing a second method by which the cursor position is manipulated through a list of destinations using the various scrolling keys of FIG. 2a. The vehicle navigation system first displays a list of destinations and waits for one of three types of scrolling signals (steps 102 and 104). If a first type (from up and down arrows 58) is detected (step 108) the system scrolls either up or down the list of destinations, consecutively highlighting destinations in the list (steps 110–114 and 130). If a second type of scrolling signal (from left and right arrows 60) is detected (step 116) the system jumps through the list of destinations with reference to a currently highlighted character position as described above (steps 118–122 and 130). If the scrolling signal received is neither of these types, but is the third type of scrolling signal (from keys 48), the system moves the cursor position either left or right within the currently highlighted destination according to whether a left or right signal is received (steps 124–130). As discussed above, once a cursor character position is selected in this manner, the jumping feature as implemented with left and right arrows 60 may be employed. After a destination is highlighted (step 130), the system determines whether an enter signal has been received (step 132). If an enter signal is received, the system calculates the route to the selected destination (step 134). If no enter signal is received, the system continues to wait for and process received scrolling signals.

Figure 3:
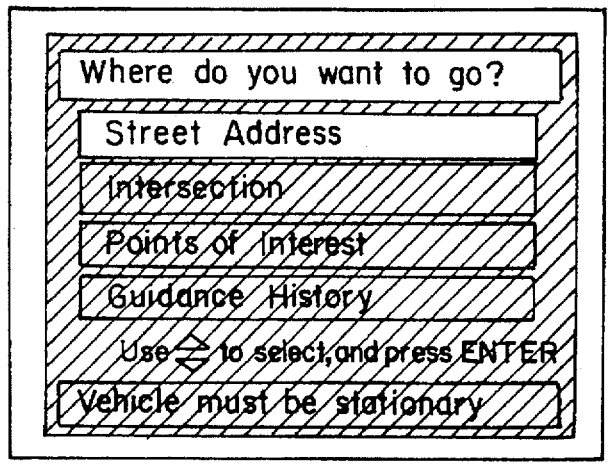
FIG. 3 is an illustration of the initial destination selection display screen encountered by a user of the vehicle navigation system when selecting a destination.

FIG. 3 is an illustration of the initial destination selection display screen encountered by a user of the vehicle navigation system when selecting a destination. As the figure shows, there are four ways in which the user may select a destination. The user may enter a specific street address, an intersection of two streets, a point of interest, or a recently visited destination using the guidance history option. To select and enter a particular option, the user highlights the desired option using scrolling key 46 and depresses enter key 50.

Figure 4A:
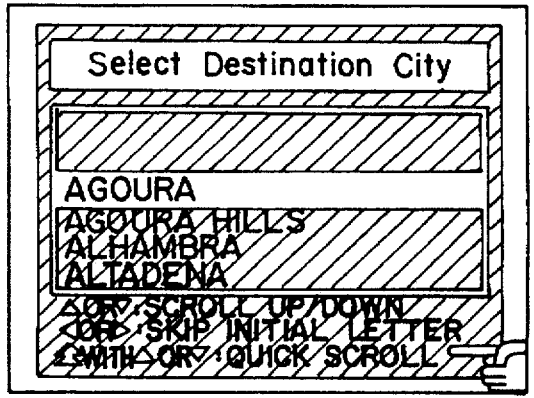
FIGS. 4a–4c are a series of display screens encountered by a user of the vehicle navigation system when selecting a destination by the street address method.
Figure 4B:
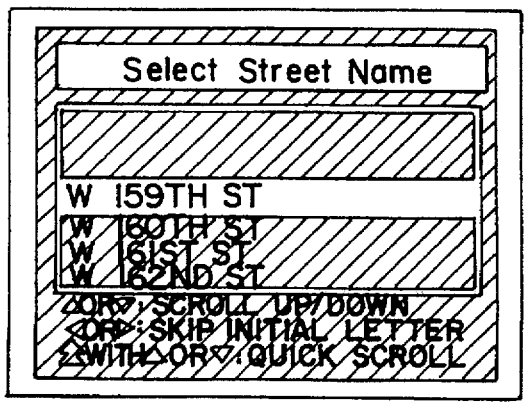
Figure 4C:
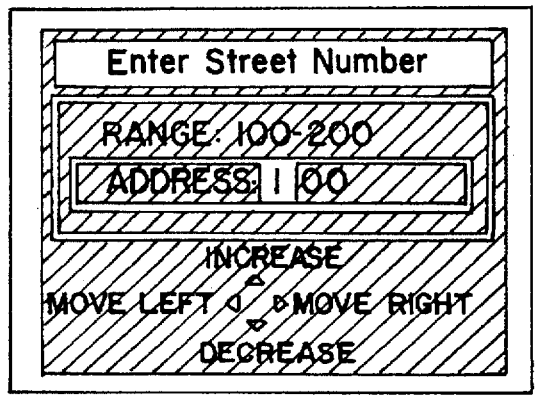

FIGS. 4a–4c are a series of display screens encountered by a user of the vehicle navigation system when selecting a destination by the street address method. After selecting the street address option from the display screen of FIG. 3, the user must first select a destination city. As shown in FIG. 4a, a list of destination cities appears on display screen 42 through which the user may scroll using scrolling keys 46 and 48 as described above with reference to FIGS. 2a and 2b. When the desired destination has been highlighted, the user may enter the selection by depressing enter key 50. This results in the "Select Street Name" screen shown in FIG. 4b. A specific street name may be highlighted and entered using the above-described procedure. This results in the "Enter Street Number" screen of FIG. 4c. With this screen, a street number within the given range is entered in the following manner. Arrows 58 are depressed until the desired alphanumeric character appears at the cursor position. Arrows 60 are then used to move the cursor horizontally to another position to select another character. When the desired street number is selected, it is entered by depressing enter key 50. At this point, the vehicle navigation system calculates the route from the user's current position to the entered destination.

Figure 4D:
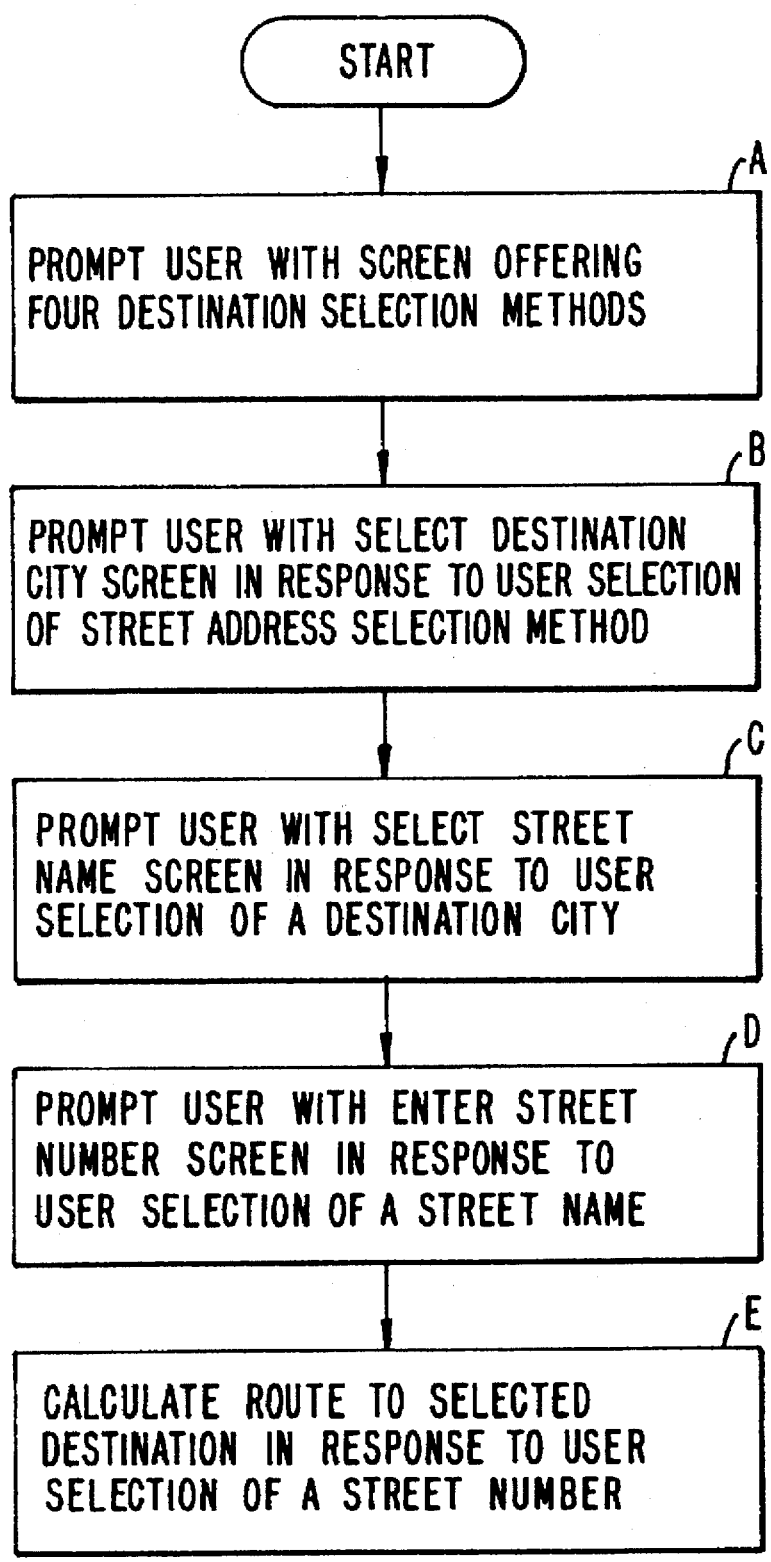
FIG. 4d is a flowchart representing the method of selecting a destination using the street address method.

FIG. 4d is a flowchart representing the method of selecting a destination using the street address method as described with reference to FIGS. 4a–4c. As described above, the system prompts the user with a screen offering four destination selection methods (step A). If the user selects the street address method, the system then prompts the user with a "Select Destination City" screen (step B). Upon selection of a destination city, the system prompts the user with a "Select Street Name" screen (step C). When the user selects and enters a street name, the system then displays the "Enter Street Number" screen (step D). Upon selection of a street number, the system calculates the route to the selected destination (step E).

Figure 5A:
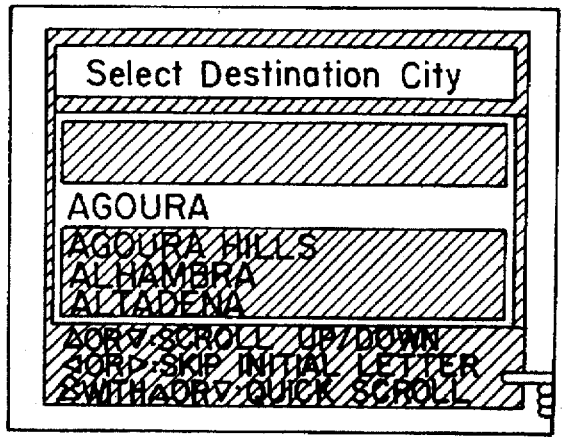
FIGS. 5a–5c are a series of display screens encountered by a user of the vehicle navigation system when selecting a destination by the street intersection method.
Figure 5B:
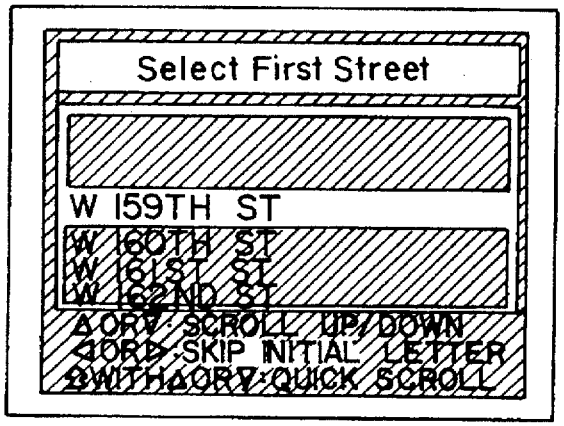
Figure 5C:
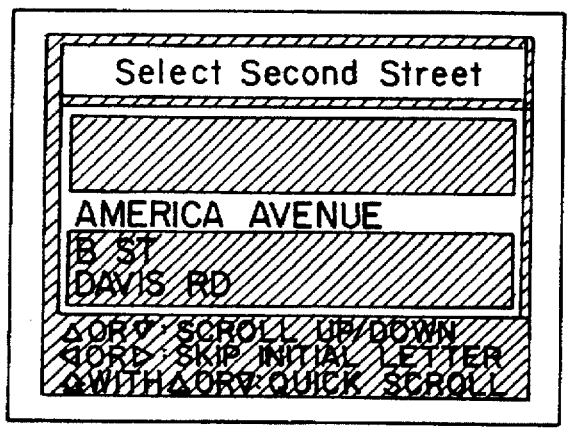

FIGS. 5a–5c are a series of display screens encountered by a user of the vehicle navigation system when selecting a destination by the street intersection method. After selecting the intersection option from the display screen of FIG. 3, the user encounters the "Select Destination City" screen of FIG. 5a from which the user may select a destination city as described above with reference to FIG. 4a. After a destination city has been selected, the user encounters the "Select First Street" screen of FIG. 5b from which the user may then select a first street name in the manner described above with reference to FIG. 4b. The selection of a first street name brings up the "Select Second Street" screen of FIG. 5c listing all of the streets stored in the system which intersect with the first street. The selection of a second street is achieved in the same manner as the selection of the first street, upon the entering of which the vehicle navigation system calculates the route from the user's current position to the entered destination.

Figure 5D:
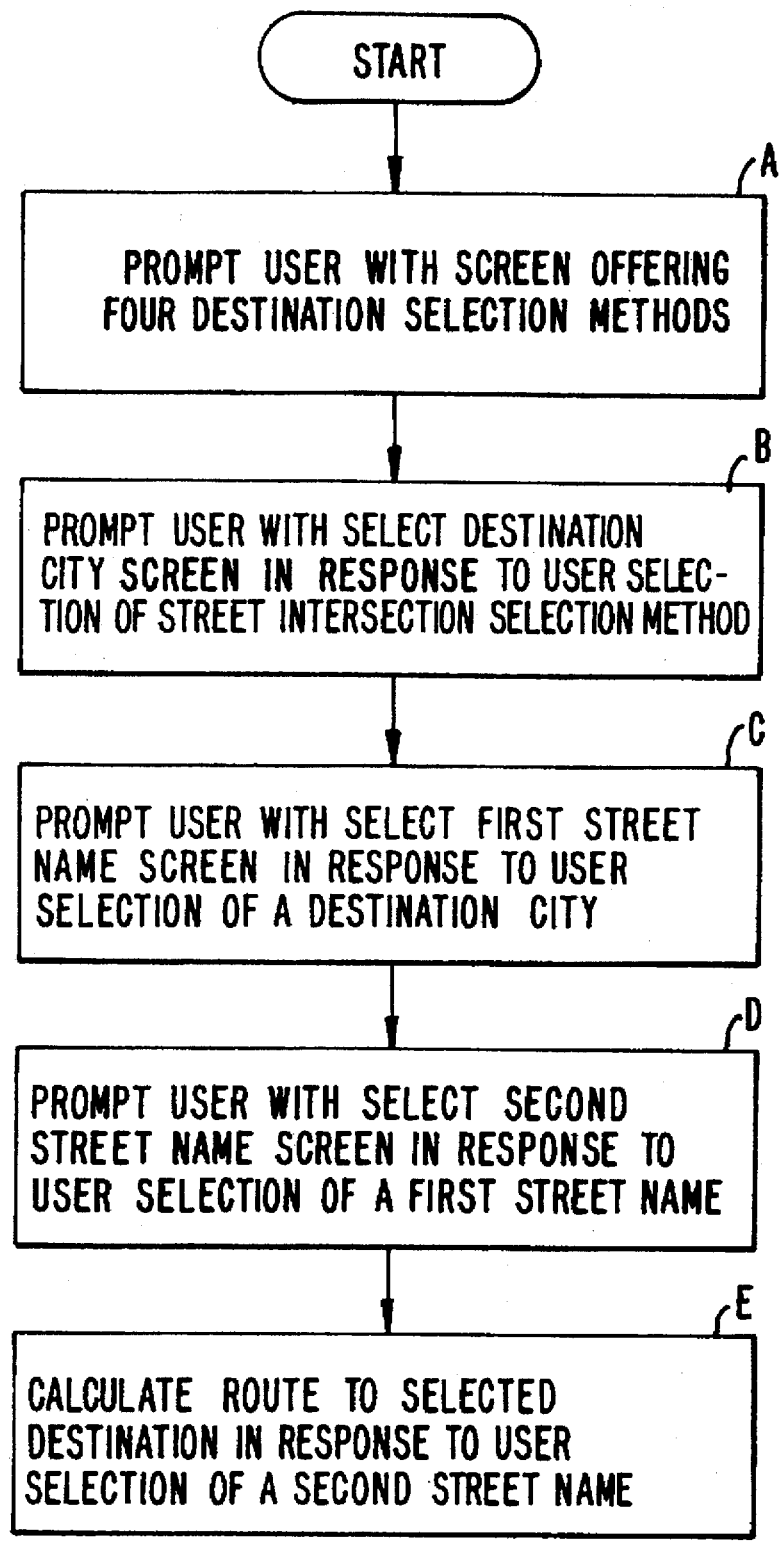
FIG. 5d is a flowchart representing the method of selecting a destination using the street intersection method.

FIG. 5d is a flowchart representing the method of selecting a destination using the street intersection method as described with reference to FIGS. 5a–5c. As described above, the system prompts the user with a screen offering four destination selection methods (step A). If the user selects the street intersection method, the system then prompts the user with a "Select Destination City" screen (step B). Upon selection of a destination city, the system prompts the user with a "Select First Street" screen (step C). When the user selects and enters a first street name, the system then displays the "Select Second Street" screen (step D). Upon selection of the second street, the system calculates the route to the selected destination (step E).

FIGS. 6a–6d are a series of display screens encountered by a user of the vehicle navigation system when selecting a destination by the points of interest method. After selecting the points of interest option from the display screen of FIG. 3, the user encounters the "Select P.O.I. Category" screen of FIG. 6a from which the user may select a particular category of locations using the procedure as described above with reference to FIG. 4a. After a category has been chosen, the user encounters the "Select Listing Mode" screen of FIG. 6b. Using the first control of scrolling key 46 and enter key 50 as described above, the user may select a listing of locations in that category by name or by distance from the user's present location. Depending upon which option is selected, the user will encounter either the screen of FIG. 6c (sort by name), or the screen of FIG. 6d (sort by distance). Selection of a particular point of interest may be effected using scrolling keys 46 and 48 as described above. Upon entering a point of interest with enter key 50, the vehicle navigation system then proceeds to calculate the route to the selected destination.

Figure 6A:
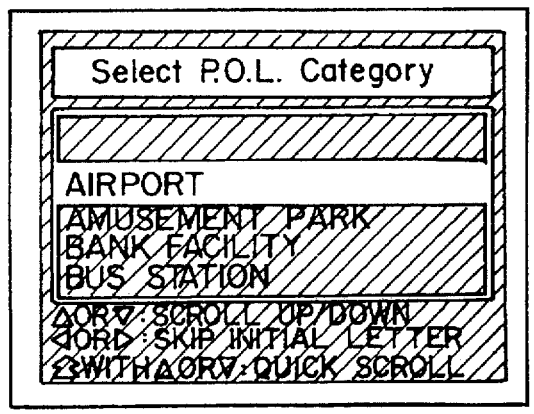
FIGS. 6a–6d are a series of display screens encountered by a user of the vehicle navigation system when selecting a destination by the points of interest method.
Figure 6B:
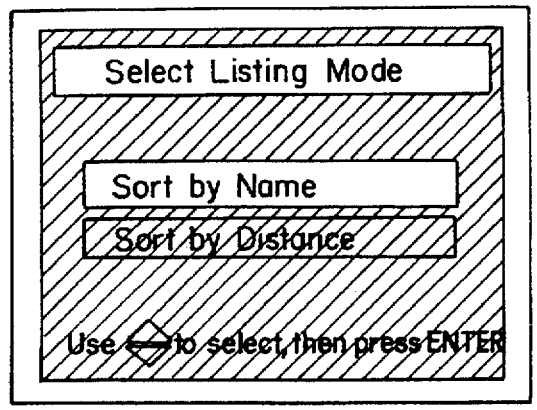
Figure 6C:
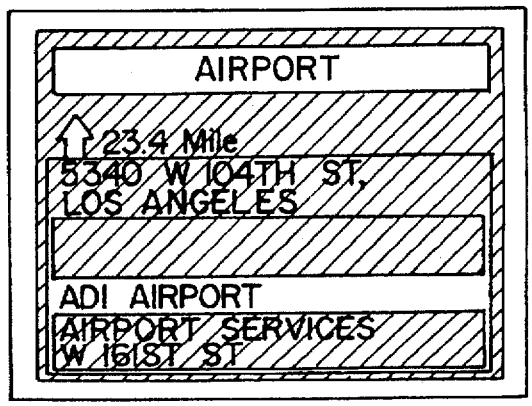
Figure 6D:
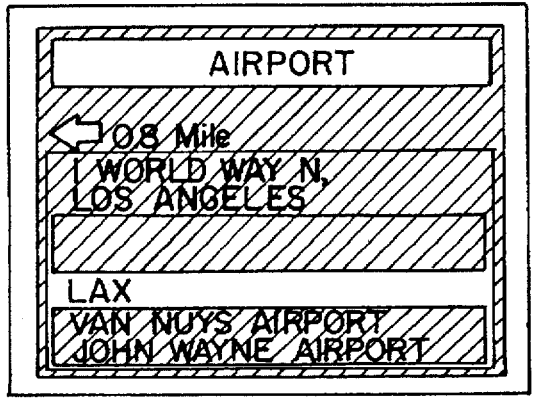
Figure 6E:
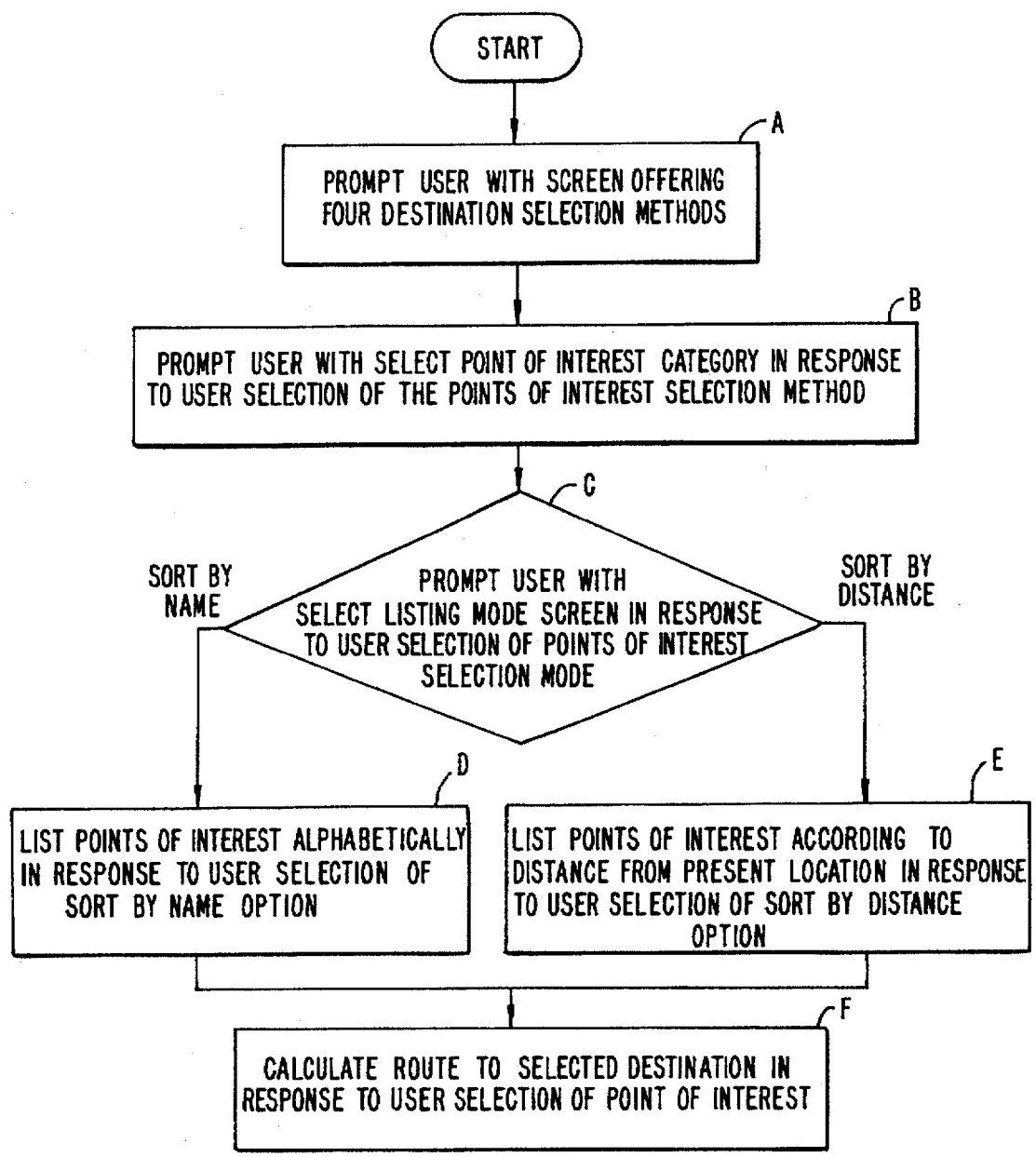
FIG. 6e is a flowchart representing the method of selecting a destination using the points of interest method.

FIG. 6e is a flowchart representing the method of selecting a destination using the points of interest method as described with reference to FIGS. 6a–6d. As described above, the system first prompts the user with a screen offering four destination selection methods (step A). If the user selects the points of interest method, the system then prompts the user with a "Select Point of Interest Category" screen (step B). Upon selection of a category, the system prompts the user with a "Select Listing Mode" screen offering the user the choice of listing the points of interest by name or by distance from the user's present location (step C). Depending upon the choice made by the user, the system then lists the stored points of interest accordingly (step D or E). When the user selects and enters a desired destination, the system then calculates the route to the destination (step F).

Figure 7A:
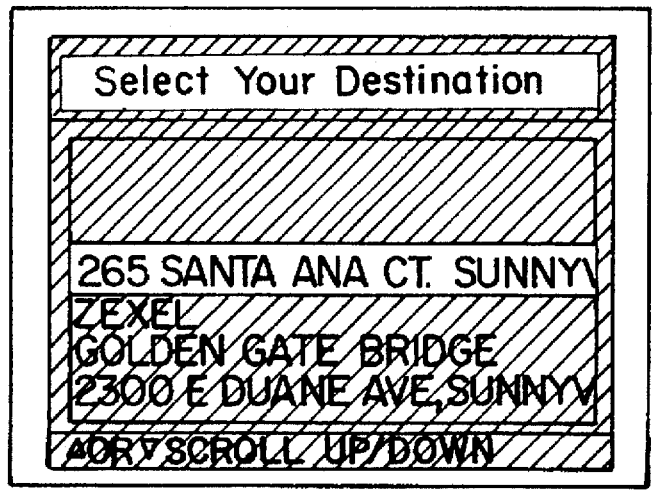
FIG. 7a is an illustration of a display screen encountered by a user of the vehicle navigation system when selecting a destination by the guidance history method.

Finally, FIG. 7a is an illustration of a display screen encountered by a user of the vehicle navigation system when selecting a destination by the guidance history method. Selection of this option from the display screen of FIG. 3 results in the screen of FIG. 7a. From this screen, the user may select a destination from a list of the most recently selected destinations. The system saves a fixed number of the most recently selected destinations. Each time a new destination is selected, the new destination is stored in the list and the oldest stored destination is automatically deleted. The scrolling, selecting, and entering of a destination using this method is substantially as described above. Upon entering one of the listed destinations, the system calculates the route to the destination.

Figure 7B:
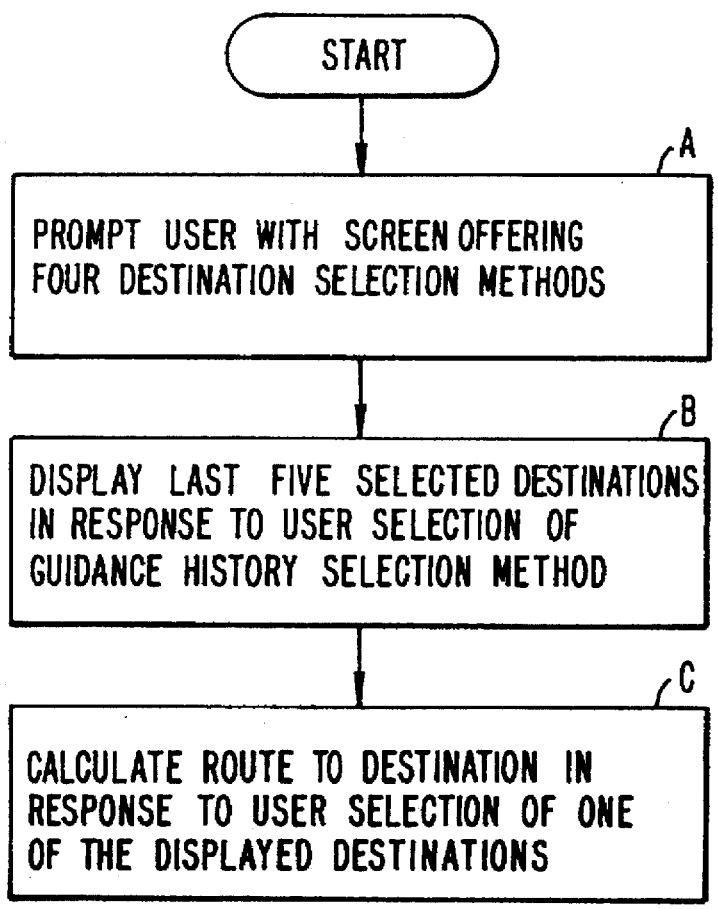
FIG. 7b is a flowchart representing the method of selecting a destination using the guidance history method.

FIG. 7b is a flowchart representing the method of selecting a destination using the guidance history method as described with reference to FIG. 7a. As described above, the system first prompts the user with a screen offering four destination selection methods (step A). If the user selects the guidance history method, the system then prompts the user with a screen displaying several of the most recently selected destinations (step B). When the user selects and enters a desired destination from the list, the system then calculates the route to the destination (step C).

The display screens of FIGS. 4–7 do not represent the only way in which information may be presented to the user of a data processing system designed according to the present invention. The screens of FIGS. 4–7 show the currently selected or highlighted entries (i.e., the entries at the cursor position) surrounded by a rectangular field of bright pixels in the display field. However, because the term "to highlight" means "to focus attention on" as well as "to illuminate", it will be understood that an entry or set of entries may be "highlighted" or "indicated" in a variety of ways. For example, a currently indicated entry could be underlined, presented in bold type, bright characters, or in any of a variety of ways to cause the entry to stand out on the display. Or more than one entry may be highlighted at a time, the scope of the highlighted area being reduced as the user narrows the selections down to a desired entry or entries. So, for example, if a user of the vehicle navigation system described with reference to FIGS. 2a–c is jumping from one subset to another using the second control of scrolling key 46, each subset to which the display jumps is entirely highlighted. As the list of entries is narrowed (using scrolling key 46 and character position selection keys 48 as described above with reference to FIG. 2c) the highlighted area narrows correspondingly until the desired entry is indicated. In such an embodiment, a single entry in the highlighted area could be designated as the current cursor position, with the cursor position being movable within the highlighted area. It will be understood that because of the variety of ways in which information may be presented on a display, the scope of the present invention is not limited to the specific embodiments described above.

It will be apparent to persons skilled in the art that the above described invention eliminates the need for the large display screens required by previous systems. Thus, the cost of the system is correspondingly reduced. Furthermore, the simple, step-by-step process by which a destination is selected, coupled with the easily understood control key configuration, provides a level of "user friendliness" which is desirable in vehicle navigation systems.

While the invention has been particularly shown and described with reference to specific embodiments thereof, it will be understood by those skilled in the art that the foregoing and other changes in the form and details may be made therein without departing from the spirit or scope of the invention. For example, it will be understood that the methods and apparatus described for selecting a destination may be employed in any general data processing system to select an entry from an alphabetically and/or numerically arranged list of entries. Moreover, it will be understood that many types of information may be presented to the user of such a system in the manner described. In addition to destinations, starting or source locations may be presented as well as a variety of other types of geographic locations. Other types of information might include travel accommodations, restaurants, telephone listings, general travel information, etc. Any type of information which may be stored in a database may be presented according to the present invention. Therefore, the scope of the present invention should be determined with reference to the following claims.

What is claimed is:

1. A method for selecting an entry stored in a data processing system, the system comprising a display, scrolling means having first and second controls, character position selection means, and selecting means, the method comprising the steps of:
   A) scrolling through a plurality of stored entries on the display, each entry comprising a plurality of alphanumeric symbols, the entries forming a first alphabetically and numerically organized list, the scrolling occurring in response to a first scrolling signal generated by the first control of the scrolling means;
   B) selecting a character position in a first indicated entry in response to a position selection signal generated by the character position selection means;
   C) jumping through the plurality of stored entries on the display, the jumping occurring in response to a second scrolling signal generated by the second control of the scrolling means, the second scrolling signal causing the display to jump to a subset of entries with the next or previous consecutive alphanumeric symbol in the character position as compared to a currently indicated entry; and
   D) entering a desired indicated entry in response to a selection signal generated by the selecting means.

2. The method of claim 1 wherein the entries comprise geographic locations and the data processing system comprises a vehicle navigation system.

3. The method of claim 2 wherein the geographic locations comprise destinations.

4. The method of claim 2 wherein the geographic locations comprise starting locations.

5. The method of claim 1 wherein the entries comprise street names and the data processing system comprises a vehicle navigation system.

6. The method of claim 1 wherein the entries comprise restaurants and the data processing system comprises a vehicle navigation system.

7. The method of claim 1 wherein the entries comprise travel information and the data processing system comprises a vehicle navigation system.

8. The method of claim 1 wherein the entries comprise telephone listings and the data processing system comprises a vehicle navigation system.

9. The method of claim 1 wherein the first scrolling signal causes the display to sequentially indicate individual entries.

10. The method of claim 1 wherein the first scrolling signal causes the display to indicate more than one entry simultaneously, thereby defining a highlighted area, the highlighted area decreasing in size as the list of entries is narrowed to the desired indicated entry.

11. The method of claim 1 wherein the system further comprises auxiliary scrolling means, the method further comprising the step of:
   E) increasing the speed of the scrolling step in response to a quick-scroll signal generated when the auxiliary scrolling means is used simultaneously with the first control of the scrolling means.

12. The method of claim 1, further comprising the step of:
   E) increasing the speed of the scrolling step in response to a quick-scroll signal generated when the first control of the scrolling means is employed for greater than a set period of time.

13. The method of claim 2, further comprising the steps of:
   E) scrolling through a plurality of stored streets, each street comprising a plurality of alphanumeric symbols, the streets forming a second alphabetically and numerically organized list, the scrolling occurring in response to the first and second scrolling signals as described in steps A), B) and C);
   F) entering a currently indicated street in response to a selection signal generated by the selecting means;
   G) scrolling through a plurality of alphanumeric characters at a cursor position on the display, the scrolling occurring in response to the first scrolling signal, the alphanumeric characters forming a third alphabetically and numerically organized list, the first scrolling signal causing the display to indicate consecutive alphanumeric characters in the third list;
   H) moving the cursor position on the display in response to the second scrolling signal;
   I) repeating steps G) and H) until a desired street address appears on the display; and
   J) entering the desired street address in response to a selection signal generated by the selecting means.

14. The method of claim 13 wherein the scrolling means comprises a generic, multi-function key, the method further comprising the steps of:
   K) displaying the plurality of stored geographic locations on the display in conjunction with steps A), B), C) and D);
   L) displaying the plurality of stored streets on the display in conjunction with steps E) and F);
   M) displaying cursor positions of alphanumeric symbols in conjunction with steps G), H), I) and J); and
   N) displaying a particular function for the scrolling means for each of steps A) through J).

15. The method of claim 13 wherein the system further comprises auxiliary scrolling means, the method further comprising the step of:
   K) increasing the speed of the scrolling steps in response to a quick-scroll signal generated when the auxiliary scrolling means is used simultaneously with the first control of the scrolling means.

16. The method of claim 13, further comprising the step of:
   K) increasing the speed of the scrolling steps in response to a quick-scroll signal generated when the first control of the scrolling means is employed for greater than a set period of time.

17. The method of claim 2, further comprising the steps of:
   E) scrolling through a plurality of stored streets, each street comprising a plurality of alphanumeric symbols, the streets forming a second alphabetically and numerically organized list, the scrolling occurring in response to the first and second scrolling signals as described in steps A), B) and C);

F) entering a first indicated street in response to a selection signal generated by the selecting means;

G) scrolling through a third list of alphabetically and numerically arranged streets, the scrolling occurring in response to the first and second scrolling signals as described in steps A), B), and C), the third list of streets comprising streets intersecting with the first indicated street; and H) entering a second indicated street in response to a selection signal generated by the selecting means.

18. The method of claim 17 wherein the scrolling means comprises a generic, multi-function key, the method further comprising the steps of:

I) displaying the plurality of stored geographic locations on the display in conjunction with steps A), B), C) and D);

J) displaying the second list of streets on the display in conjunction with steps E) and F);

K) displaying the third list of streets in conjunction with steps G) and H); and L) displaying a particular function for the scrolling means for each of steps A) through H).

19. The method of claim 17 wherein the system further comprises auxiliary scrolling means, the method further comprising the step of:

I) increasing the speed of the scrolling steps in response to a quick-scroll signal generated when the auxiliary scrolling means is used simultaneously with the first control of the scrolling means.

20. The method of claim 17, further comprising the step of:

I) increasing the speed of the scrolling steps in response to a quick-scroll signal generated when the first control of the scrolling means is employed for greater than a set period of time.

21. The method of claim 1 wherein the entries comprise categories of points of interest, the method further comprising the steps of:

E) selecting an organization scheme for a listing of points of interest in response to the first scrolling signal;

F) entering the organization scheme in response to a selection signal generated by the selecting means;

G) scrolling through a plurality of stored points of interest, each point of interest comprising a plurality of alphanumeric symbols, the scrolling occurring in response to the first and second scrolling signals as described in steps A), B) and C); and H) entering a currently indicated point of interest in response to a selection signal generated by the selecting means.

22. The method of claim 21 wherein the scrolling means comprises a generic, multi-function key, the method further comprising the steps of:

I) displaying the plurality of categories of points of interest on the display in conjunction with steps A), B), C) and D);

J) displaying at least one organization scheme of points of interest on the display in conjunction with steps E) and F);

K) displaying the plurality of stored points of interest on the display in conjunction with steps G) and H); and L) displaying a particular function for the scrolling means for each of steps A) through H).

23. The method of claim 21 wherein the system further comprises auxiliary scrolling means, the method further comprising the step of:

I) increasing the speed of the scrolling steps in response to a quick-scroll signal generated when the auxiliary scrolling means is used simultaneously with the first control of the scrolling means.

24. The method of claim 21, further comprising the step of:

I) increasing the speed of the scrolling steps in response to a quick-scroll signal generated when the first control of the scrolling means is employed for greater than a set period of time.

25. An apparatus for selecting an entry stored in a data processing system, comprising:

a display;

a memory coupled to the display for storing alphabetically and numerically organized lists of entries, each entry comprising a plurality of alphanumeric symbols;

scrolling means coupled to the display for generating first and second scrolling signals;

first control means coupled to the scrolling means for scrolling through the list of entries on the display in response to the first scrolling signal;

character position selection means coupled to the display for generating a position selection signal;

character position control means coupled to the character position selection means for selecting a character position in a first indicated entry in response to the position selection signal;

second control means coupled to the scrolling means, the second control means for causing the display to jump from a currently indicated entry to a subset of entries with the next or previous consecutive alphanumeric symbol in the character position as compared to the currently indicated entry in response to the second scrolling signal; and selecting means coupled to the display for generating a selection signal for entering a desired indicated entry.

26. The apparatus of claim 25 further comprising auxiliary scrolling means coupled to the display which, when used simultaneously with the scrolling means, generates a quick-scroll signal in response to which the scrolling speed is increased.

27. The apparatus of claim 26 wherein the scrolling means comprises a four position button, the auxiliary scrolling means being located adjacent the button so that a user may use the button and the auxiliary scrolling means simultaneously and with one hand.

28. The apparatus of claim 27 wherein the four position button is capable of performing different selecting functions, operational data concerning a current selecting function appearing on the display.

29. The apparatus of claim 25 further comprising cancelling means coupled to the display which generate a cancellation signal in response to which an entry selection entered by the selecting means is cancelled.

* * * * *